June 3, 1924.
C. H. WHITE
PLANTING MECHANISM
Original Filed March 19, 1918    4 Sheets-Sheet 1
1,496,042
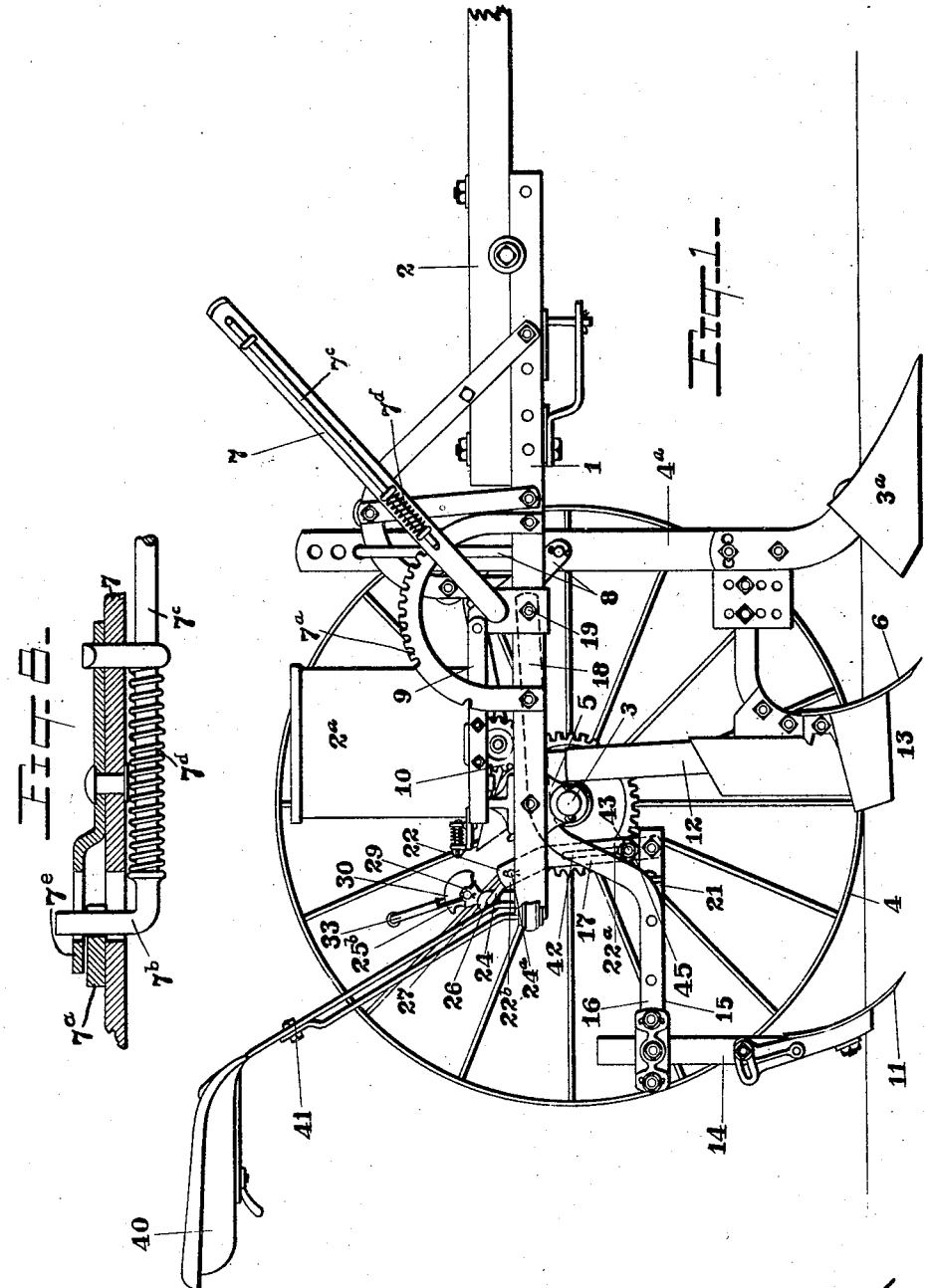

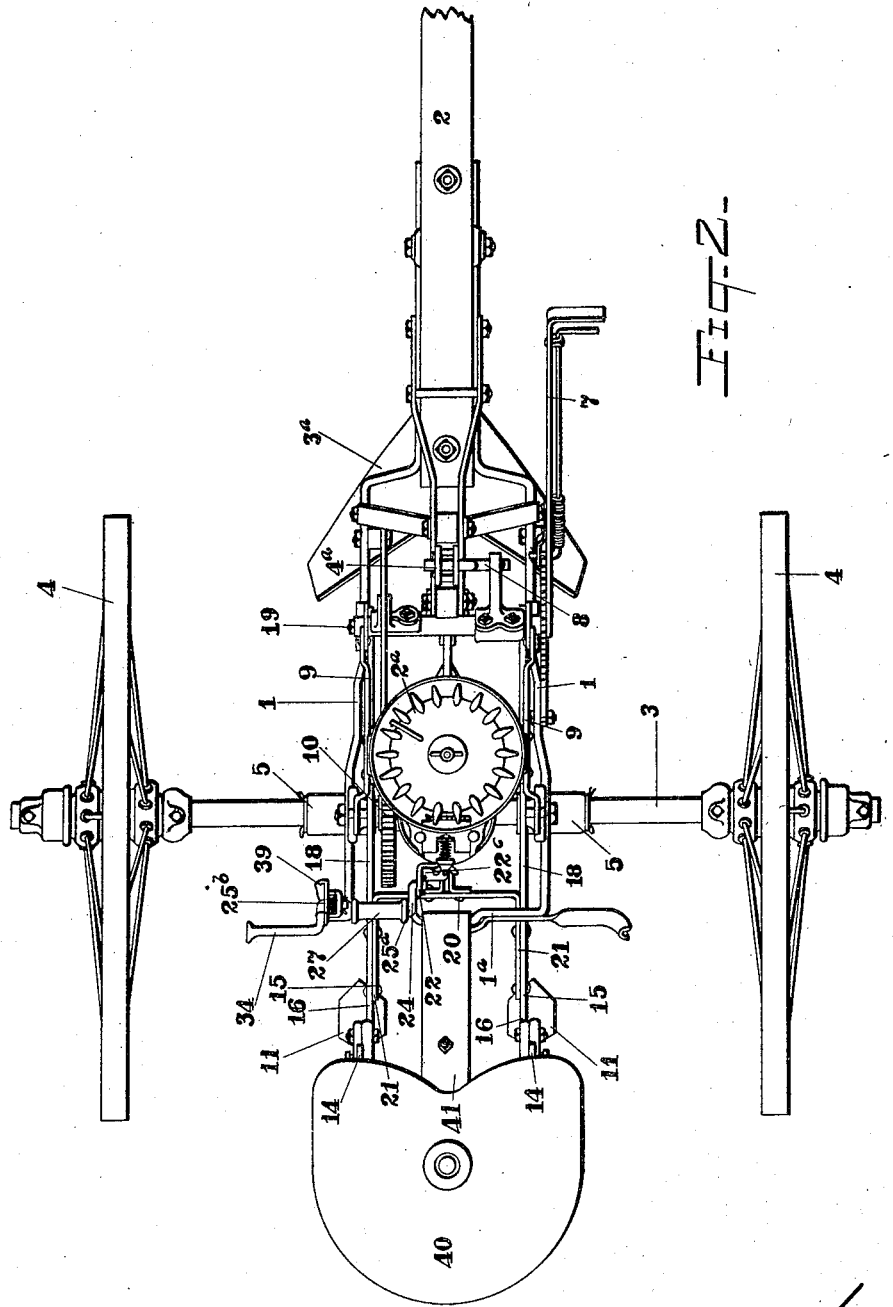

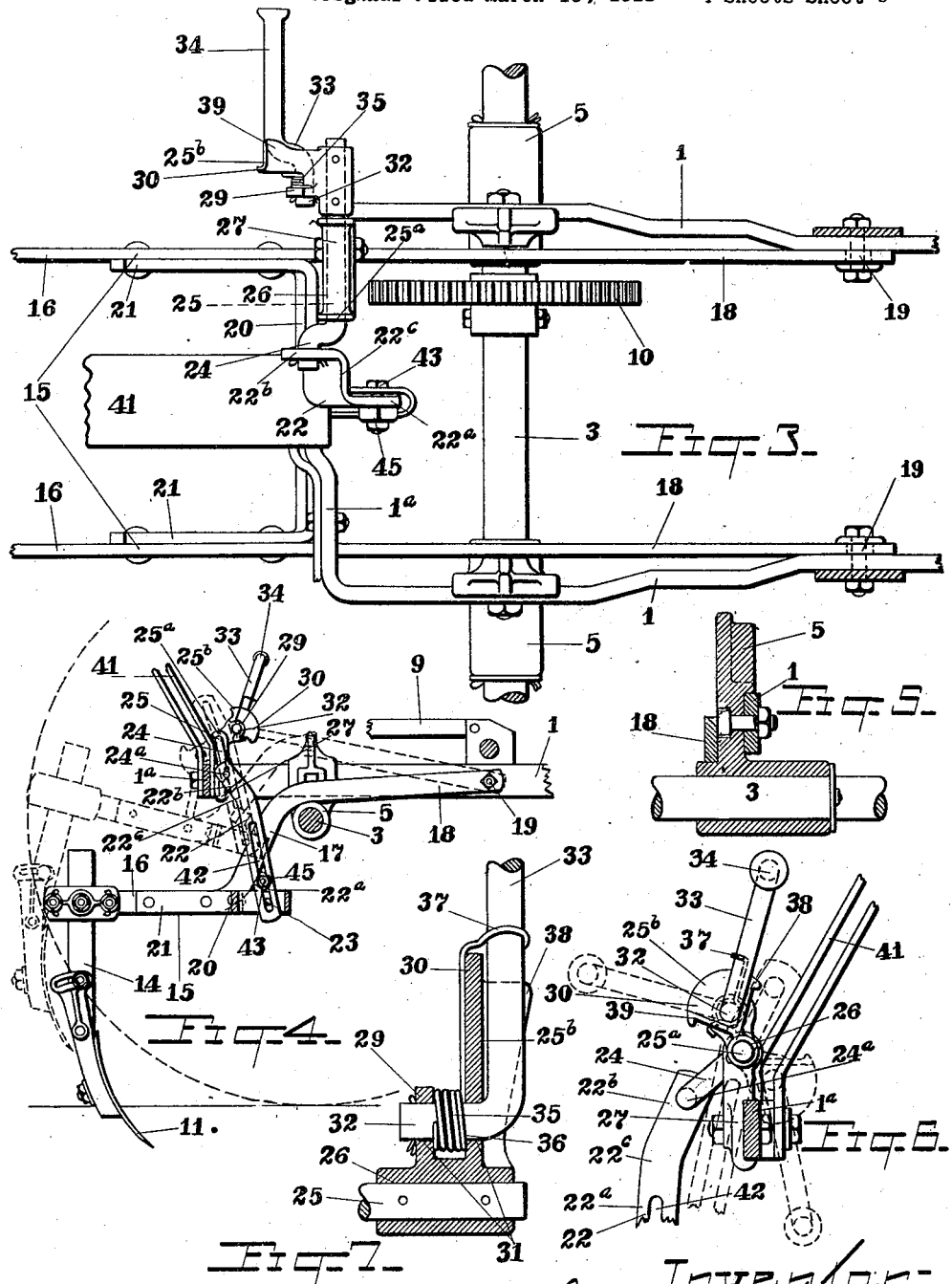

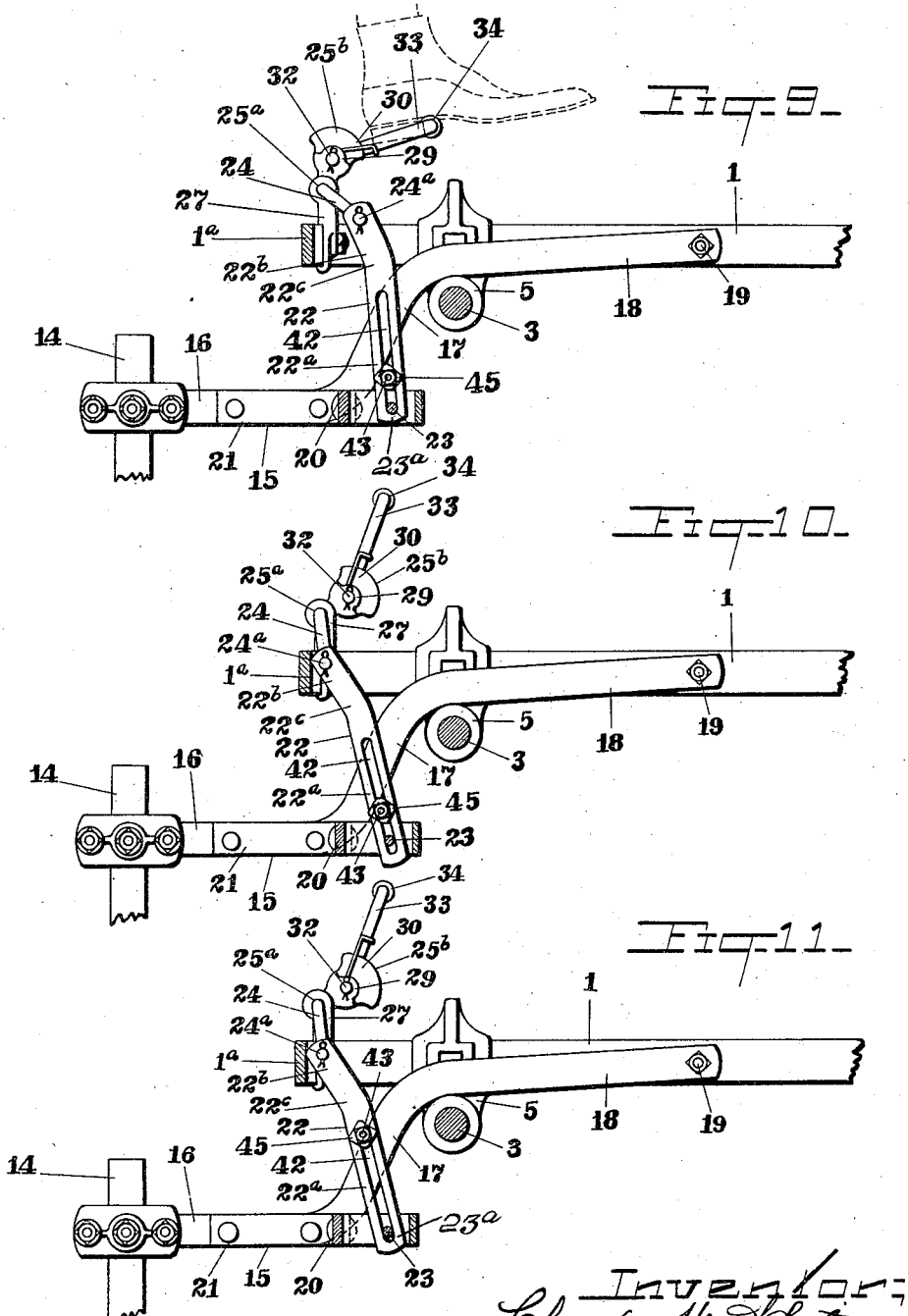

Patented June 3, 1924.

1,496,042

UNITED STATES PATENT OFFICE.

CHARLES H. WHITE, OF MOLINE, ILLINOIS, ASSIGNOR TO DEERE & COMPANY, OF CHICAGO, ILLINOIS, A CORPORATION OF ILLINOIS.

PLANTING MECHANISM.

Application filed March 19, 1918, Serial No. 223,352. Renewed November 8, 1923.

*To all whom it may concern:*

Be it known that I, CHARLES H. WHITE, citizen of the United States, residing at Moline, in the county of Rock Island and State of Illinois, have invented certain new and useful Improvements in Planting Mechanisms, of which the following is a specification, reference being had therein to the accompanying drawing.

This invention relates to improvements in farm implements of the sort in which use is made of earth-working tools (for example, seed-covering hoes, cultivator-shovels, and the like) which, at times, should be fixed for working continuously on predetermined horizontal lines; at other times, can be lifted to, and automatically locked in, elevated positions, where they are inactive.

One of the objects of the present invention is to so construct and arrange the devices of the class last-referred to that they can be easily let down to, and locked in their predetermined working position; that they can be easily lifted to, and automatically locked in, their uppermost inactive position; that they can be so adjusted that they may be let down to a working position (without necessarily locking them there), from which the operator can, at option, depress them more or less for working at a greater or lesser depth; and that they can, under other adjustments, be suspended in such way as to float yieldingly while they are moving along the ground. The present improved means for holding and adjusting these tools are particularly well adapted for use in corn-planting mechanisms of the class used in trench and ridge work.

In some territories, for example, in extensive cotton-growing regions in the southern part of the United States where cotton and corn are planted, the soil is heavy, compact and hard. It presents severe resistance to earth-penetrating tools, and requires prolonged draining and aerating prior to the depositing of the seeds therein. The common practice is to form, in the late summer or early fall of the year, comparatively deep, wide trenches or furrows, two three or more feet apart, with intervening ridges formed by the double-acting plows, which throw the soil from these trenches upward, and then to the right and to the left, on the intervening strips of land. The soil so trenched and ridged stands exposed until the early part of the following spring. While standing, the soil of the ridges is drained and aerated, but again becomes compact, and generally very hard.

Before the seeds of the cotton or corn can be advantageously deposited in such soil, it is necessary to remove the top layer (several inches in depth) of each ridge, to expose a smooth, clean and comparatively pulverulent surface, the hard top earth plowed up and swept off being deposited in the trenches; then form a seed-furrow in this flat, exposed surface; then deposit the seed in the furrow; and, finally, pulverize the soil adjacent to the seed by breaking it up and loosening it, and depositing it upon the seed.

The resistance offered by the hard, compact soil at the surface of such land cannot be overcome by the tools attached to the ordinary planting machines—that is, machines which have devices for furrow-opening and seed-depositing that are designed for use in fields with continuously flat surfaces. For the work now being referred to, specially-designed tools are required which have strong draft devices and strong wheel-supports, the former being brought back close to the axle or wheel-frame, and all arranged compactly and firmly. The wheels are arranged to run in the trenches, and serve as abutments to take the lateral thrusts and torsional reactions exerted by the hard surface earth upon the widely extended plow-sweep. This strong framework must remain stationary, vertically. And, therefore, the seeding mechanism, the plowing device and the furrow-opening device must be adjusted vertically in relation to the wheels and the draft, to either position them in different working planes or to take them to or from their position of inaction or their position of operation. Again, the plowing or sweep device, the furrow-opening device and the seed-depositing device must be maintained in horizontal parallelism while they are moving vertically, in order to maintain uniformity in their work at all levels in depositing the seed.

Machines of this class must also be provided with seed-covering hoes and soil-pulverizing devices positioned in the rear of the seed-depositing devices. Heretofore, these covering-hoes and cultivating-shovels have been so supported and arranged that they were, automatically, raised or lowered simultaneously with the raising or lowering of the plowing, furrow-opening and seeding devices, the latter being connected to the former by one mechanical device or another by which both were put simultaneously in motion from the same source of power.

I have found that when a planting mechanism of the sub-class referred to is being operated in a soil of the sort specified, much better results can be obtained if the hoes or covering shovels are mounted independently of the devices which lower and lift the plow, the opener and the seeder, and are adjustable independently thereof, so that the operator can at any time modify the action of the covering and pulverizing devices in correspondence with the hardness and other characteristics of the soil. When devices of the earlier systems were used, (including mechanical connections between these hoes or shovels, on the one hand, and the plow, the opener and the seeder, on the other hand,) it was found difficult to provide for the various adjustments of the hoes which had been known to be desirable.

Fig. 1 is a side elevation of a mechanism embodying my improvements.

Fig. 2 is a plan view.

Fig. 3 is a view, partially in horizontal section, and partially in plan, showing parts of the frame, and also the foot-lever system for adjusting the hoes.

Fig. 4 is a view, partly in vertical section, partly in side elevation, showing one of the hoes, its support, and the lifting mechanism.

Figs. 5, 6, 7 and 8 are details.

Figs. 9, 10 and 11 illustrate various ways of adjusting parts connected with the hoe frames to make them capable of different methods of use.

There is a main frame provided, having the cross-bar $1^a$ and the side longitudinal bars 1, 1, extending from the cross-bar forward to, and secured to the tongue 2. The frame is mounted upon the axle 3, and, upon the latter, at its ends are mounted the ground-wheels 4, 4. The axle rotates in bearings 5, secured to the main frame-bars.

The machine illustrated is, or may be, of any of the now well-known forms, as concerns the constructions and the relations of the tongue, the main frame 1, the seed-carrying-and-delivering mechanism at $2^a$, the plow or sweep $3^a$, the sweep-standard $4^a$, the furrow-opener 6, the plow-lifting lever 7, the connecting devices at 8, the support 9 for the seed-holding-and-delivering devices, and the separable gearing at 10, these being characteristic of planters of this sub-class.

The framework is strong and rigid, and connected up to the wheel frame or axle as closely and firmly as possible. The wheels roll in two of the trenches, and are positioned to resist the thrusts and torsional strains which are exerted upon them and upon the frame by the plowing device or sweep $3^a$ as it is forced through the compact hardened soil at the tops of the ridges. It shaves off this top soil and delivers it again to the trenches, leaving a flat surface of fresh, pulverulent earth susceptible of having a seed-furrow formed therein, and of having the seed advantageously deposited in such furrow. The furrow-opener 6 extends, adjustably, to a horizontal plane below that at the bottom of the sweep $3^a$ and opens a furrow of a depth determined for the particular seed, the conditions of the soil, and the like.

When the operator desires to adjust the position of these devices for variations in work, he, by lever 7, and the connecting crank and link devices at 8, lifts or lowers the standard $4^a$ by positioning the sweep $3^a$ and the furrow-opener 6 as required. When he desires to throw these parts and the seeder out of operation, he, by the same lever, elevates the sweep and the opener to points above the surface, and during this movement throws the seeder-carrier at 9 upward far enough to separate the driving gear at 10, one of the gear-wheels being mounted on, and driven by, the axle.

He locks the parts just specified in the desired position of adjustment (independently of the other operative elements to be described) by means of the segment $7^a$, the detent $7^b$ at the end of the rod $7^c$, which are normally pushed inward by spring $7^d$, the lever having a brace plate $7^e$ on the inside of the segment $7^a$, through a slot in which the detent finger $7^b$ passes, as shown in Figs. 1 and 8.

The devices which are employed for closing the furrow, covering the seed, and pulverizing the adjacent soil are the hoes or shovels at 11, one on each side of the seed deposited from the tube 12 at 13. Each hoe is carried adjustably by a standard 14, and each standard is connected to a drag-bar, indicated as an entirety by 15, and formed to have a lower rear part 16, an inclined part 17 and an upper, approximately horizontal part 18. The part 18 lies above the axle 3, and extends forward some distance along the inner face of the side-bar 1 of the main frame, and its inner end is secured to the frame by horizontal pivot 19. The two drag-bars 15 are connected together rigidly by a cross-frame, having arms 21 riveted to the drag-bars, and an integral cross-bar 20. 22 is a link bar loosely connected to the hoe frame by pin 23 at the axis $23^a$. As shown, this link is formed of a bar, bent somewhat at $22^c$ to provide a lower arm $22^a$ and an upper arm $22^b$. In the lower part of the link there is a relatively long slot 42, through which passes the aforesaid pin 23. In the slot there is also placed an adjustable stop. It is formed of a threaded pin 43 and a clamp button or nut 45. When the latter is loosened the pin can be moved vertically from one position to another in the slot and can be re-fastened by the button or nut 43.

The link 22 extends up to and is pivotally connected at the axis 24ª to a crank arm 24. The crank is part of or carried by a rock shaft 25, mounted on the axis 25ª in a sleeve bearing 26, which is part of a bracket casting 27, bolted to the cross frame bar 1ª. To the outer end of the rock shaft 25 is rigidly secured a casting 25ᵇ. The latter is formed with one or more projecting arms, as at 29 and 30, in which there is a bearing, in apertures 31, and in this bearing is mounted the journal part 32 of a foot lever 33. The radius part or lever proper, 33, is at right angles to the journal part and it extends from the latter to the pedal arm 34. 35 is a spring, one end of which is coiled at 36, around the journal parts 32 of the foot lever, and the other end of which, at 37, is coiled around or bent to provide loop engagement with the radius part 33 of the foot lever. This radius part lies between two flanges or lugs 38, 39 on the expanded arm part 30 of the casting and it can vibrate between these flanges or lugs, as limits, without moving the rock shaft 25; but if the foot lever is pushed still further after contacting with one of the flanges or lugs 38, 39, the entirety of the rocking device swings on the axis of the shaft 25. The foot lever 33 is normally held against lug 38 by the said spring 35; but the operator by his foot can easily push the lever against the spring and carry it over to the lug 39, which places it in an advantageous position for operation by the operator's foot in applying downward pressure to the carrier so that he can easily control the operating depth thereof when the parts are arranged as shown in Figure 9. Also when the hoes are locked down in operating position, as shown in Figure 10, or when they are in their floating position, shown in Figure 11, the lever then forms a convenient foot rest for the operator. The driver's seat is indicated by 40, it being supported on a standard 41, which extends downward at an inclination, and forward to the rear cross bar 1ª of the frame, to which it is rigidly secured. The link 22 is positioned in front of the seat standard and the latter serves as a stop against the backward movements of the link; but in lieu of this any suitable stop can be provided.

The method of operating the parts above described may be readily understood.

If the soil be of such nature that the best working results will be attained, if the hoes and the other parts are so related that the operator can either permit them to rise and fall to a limited extent or can by his foot leverage force them down or hold them down for longer or shorter intervals (possibly freeing them of his foot pressure and weight at times), the stop 43—45 is fastened in position in the lower part of the slot 42, as shown in Fig. 9. When the stop is thus adjusted, should the hoes move upward at all they tend to rock the pedal 34 backward and upward, which motion can be resisted to the desired degree by the operator's foot. When the stop 43—45 is thus positioned as in Fig. 9 at its lowermost point in the slot 42, the axis at 24ª does not cross the plane, which contains the axes 23ª and 25ª, and so there is a resistance to positive locking.

But if the soil and other conditions be such that it is desirable to lock the hoes down and eliminate any tendency to rise, the stop 43—45 is set at a point in the slot 42 somewhat higher, as shown in Fig. 10. When so adjusted the operator by applying pressure to the foot lever 33 can rock the crank 24 far enough to cause the axis 24ª to swing backward across the plane, which includes the axes 23ª and 25ª. The link then abutting against the frame bar or against the driver's seat stand; the hoes will be held down positively until the operator forces the axis 24ª forward again across the aforesaid plane.

If it is desired to have the hoes and hoe frame free to swing upward as far as practical conditions ever call for, the stop 43—45 is moved up to and fastened in the upper end of the slot 42, as shown in Fig. 11. The link, at the lower end of the slot holds the hoe frame in its elevated position, and the axle bearings 5 co-operate with the parts 18 to prevent the hoes from entering the soil beyond a predetermined distance, but they can spring up or rise if occasion demands, irrespective of the link and of its attachments.

The possibility for, and the actions of the parts in, lifting the hoe frame to its uppermost position (as when the implement is being transported from place to place) are the same at all times, that is to say, to thus lift the hoes and their frame at any time the operator pushes the foot lever 33 in the opposite direction, that is, backward and downward, to the position indicated by dotted lines. During this motion of the foot lever the crank 24 and the upper end of the link 23 swing forward upward and then backward to the positions shown in dotted lines. The bottom of the link pulls up on the pin 23 and carries the hoe frame to an upward and backward inclined position, as indicated. It will be seen that all of these adjustments of the rear covering and cultivating tools are independent of the plow, the furrow opener and the seeding mechanism; and that the adjustable parts are of such nature that the operator can, by simple foot movements, attain all of the different manipulations of the tools that are necessary to meet the varying conditions of the soil.

It will be seen that the parts may be so arranged that during the range of all of the working positions the hoes and the hoe frame are normally free to move vertically and accommodate themselves to the conditions that are present as illustrated in Figures 9 and 11; and also that the power devices and power transmitting link, when the tool is in any of its working positions, are also normally free to be moved vertically. Consequently within the limits of this range of positions there is no lock or fixed holding device between the main frame and the hoe or other tool, on the one hand, or between the frame and the power devices, on the other. When the parts are set, for example, as in Fig. 9, the operator can, at any time, without being required to move any stop or open any lock, instantly put the tool to a lower position (within the range aforesaid) or allow it to rise. With a mechanism such as shown he does this frequently in order to have the tool work properly in relation to the sweep and the seeder.

I have described my improved implement in connection with its use for planting cotton in the ridges between the trenches, but it will be understood that it may also be used in various other ways. For example, it may be employed for planting corn in the trenches instead of on the ridges, in which case the sweep will loosen the soil in the bottom of the trench, and the hoes will straddle the trench and move the soil thereinto from the sides thereof to cover the seed; or, if desired, the implement may be used for planting a comparatively level field, in which case the sweep will open the furrow and the hoes will cover the seed planted in it. The shape of the tools illustrated in the drawings may, of course, be varied to suit the conditions under which the implement is used.

What I claim is:

1. In an implement of the class described having a main frame and supporting wheels, the combination therewith of an earth-working tool, a tool carrier mounted on the frame to be movable freely vertically through a range of working positions, and also to be elevated to and held in an inactive position, a power device, and means operatively connecting the power device with the carrier whereby the carrier may be raised by the power device to its inactive position or be lowered to its operative position, said means being adjustable to permit a variable range of movement of the carrier independently of the power device.

2. In an implement of the class described having a main frame and supporting wheels, the combination therewith of an earth-working tool, a tool carrier mounted on the frame to be movable freely vertically through a range of working positions, and also to be elevated to and held in an inactive position, a power device, and means connecting the power device with the carrier whereby the carrier may be raised by the power device to its inactive position or be lowered to its operative position, said connecting means being adjustable either to prevent the carrier from moving independently of the power device, or to permit the carrier to move within variable limits independently of the power device.

3. In an implement of the class described having a main frame and supporting wheels, the combination therewith of an earth-working tool, a tool carrier mounted on the frame to be movable freely vertically through a range of working positions, and also to be elevated to and held in an inactive position, a power device operable to elevate the carrier to its inactive position and to hold the carrier down in operative position, and means operatively connecting the power device with the carrier, said means being adjustable to provide a variable range of movement of the carrier independently of the power device.

4. In a planting mechanism of the class described having a wheeled main frame, the combination with said frame of a tool carrier, an earth-working tool carried thereby, and adapted to be moved vertically independently of the main frame, a lifting device comprising a power device supported by the main frame and operating connections between said power device and the tool carrier arranged to be actuated by said power device either to elevate the tool carrier out of its operative position or to apply downward pressure thereto when it is in its operative position, said connection being adjustable to permit a variable range of vertical movement of the carrier independently of the power device.

5. In an implement of the class described, the combination with the wheel supported main frame, of the tool, the tool carrier normally adapted to be automatically moved freely vertically through the range of a series of relatively low working positions, the link adjustably connected to the carrier, the reversible foot-actuated power devices connected to the link, said power devices and link being normally free to be moved vertically relatively to the frame and to the carrier through a range of positions corresponding to the aforesaid working positions of the tool and also adapted to be elevated above said positions to hold the tool and tool frame in a position of inaction, and means on the main frame for positively holding the link in said elevated position.

6. In a mechanism of the class described, the combination of the main frame, the hoes, the hoe frame pivotally connected to the main frame, the reversible foot actuated power device on the main frame, the link interposed between the power device and the hoe frame and adjustably connected to the latter, a stopping device on the main frame with which the link engages in two positions under the action of the gravity of the hoes and hoe-frame, one of said positions corresponding to the position of operation of the hoes, and the other corresponding to the elevated position of inaction of the hoes.

7. In a mechanism of the class described, the combination with the main frame, the hoes and the hoe frame pivotally connected to the main frame, of the foot actuated reversible power device on the main frame, the link between the power device and the hoe frame and adjustably connected to the latter, and the stopping device on the main frame with which the link engages, both when the hoes are in their operative position and when they are in an elevated position of inaction, the reversible power device being adapted to move the hoes and hoe-frame from one of said positions to the other.

8. The combination of the main frame, the hoes 11, the hoe frame pivotally connected with the main frame adapted to move freely independently of the frame when the hoes are at work, the reversible foot-actuated power device on the main frame, an element connected with and movable upwardly and downwardly by said power device and provided with a stop for bearing unyieldingly down on the hoe frame, said stop being movable upward away from the hoe frame by said power device and being adjustable to different points upward and downward on said element.

9. The combination of the main frame, the hoes 11, the hoe frame pivotally connected with the main frame, movable freely independently of the main frame when the hoes are at work, the reversible foot-actuated power device on the main frame, an element connected with and movable upwardly and downwardly by said power device and provided with a stop for bearing down on the hoe frame, said stop being movable upward away from the hoe frame by said power device and being adjustable to different points upward and downward on said element, said element having means independent of said stop for lifting the hoe frame.

10. In an implement of the class described having a main frame and supporting wheels, the combination therewith of an earth-working tool, a tool carrier mounted on the frame to swing vertically through a range of working positions, and also to be elevated and be held in an inoperative position, a rocking lever mounted on the main frame for raising or lowering said tool carrier, a crank adapted to be rocked by said lever, means forming a connection between said crank and said tool carrier and adapted to permit the carrier to move vertically independently of said rocking lever, and adjustable means for preventing, or for varying the extent of, such independent vertical movement.

11. In an implement of the class described having a main frame and supporting wheels, the combination therewith of an earth-working tool, a tool carrier mounted on the frame to swing vertically through a range of working positions, and also to be elevated and be held in an inoperative position, a rocking lever mounted on the main frame for raising or lowering said tool carrier, a crank adapted to be rocked by said lever, a slotted link forming a connection between said crank and said tool carrier adapted to permit the carrier to move vertically independently of said rocking lever, and adjustable means for varying the effective length of said slot in said link to prevent, or to vary the extent of, such independent vertical movement of the carrier.

In testimony whereof, I affix my signature.

CHARLES H. WHITE.